United States Patent
Kakiuchi

(10) Patent No.: US 7,400,823 B2
(45) Date of Patent: Jul. 15, 2008

(54) CAMERA PROVIDED WITH CAMERA-SHAKE COMPENSATION FUNCTIONALITY

(75) Inventor: Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 299 days.

(21) Appl. No.: 11/175,145

(22) Filed: Jul. 7, 2005

(65) Prior Publication Data

US 2006/0008263 A1 Jan. 12, 2006

(30) Foreign Application Priority Data

Jul. 9, 2004 (JP) .............................. P2004-203173

(51) Int. Cl.
*G03B 17/00* (2006.01)
*H04N 5/228* (2006.01)
(52) U.S. Cl. ..................................... 396/55; 348/208.4
(58) Field of Classification Search .................. 396/55, 396/52; 348/208.5, 508.6, 208.7, 208.4, 348/208.11, 208.16, 208.8, 208.9, 208.1, 348/56, 208.99, 208.6

See application file for complete search history.

(56) References Cited

U.S. PATENT DOCUMENTS 5,666,158 A * 9/1997 Sekine et al. .......... 348/209.99
5,734,932 A * 3/1998 Washisu ...................... 396/55
6,456,790 B2 9/2002 Sasaki et al.
6,603,927 B2 8/2003 Enomoto

FOREIGN PATENT DOCUMENTS

JP 6-67255 3/1994

OTHER PUBLICATIONS

English language Abstract of JP 6-67256.
U.S. Appl. No. 11/135,303 to Seo et al., which was filed on May 24, 2005.

* cited by examiner

*Primary Examiner*—Rodney E Fuller
(74) *Attorney, Agent, or Firm*—Greenblum & Bernstein, P.L.C.

(57) ABSTRACT

A camera provided with camera-shake compensation functionality that comprises a camera-shake detector, a photographing mode selector, an adjuster, and an anti-shake mechanism. The camera-shake detector detects a quantity of shake of the camera. The photographing mode selector is used to select a photographing mode. The adjuster adjusts output signals from the camera-shake detector, in accordance with the photographing mode selected by the photographing mode selector. The anti-shake mechanism compensates for a camera-shake to be counteracted, based on the output signals adjusted by the adjuster.

4 Claims, 4 Drawing Sheets

CAMERA PROVIDED WITH CAMERA-SHAKE COMPENSATION FUNCTIONALITY

BACKGROUND OF THE INVENTION

1. Field of the Invention

The present invention relates to a camera-shake compensation device (anti-shake device) which is provide in an optical apparatus such as a camera, a binoculars, and the like.

2. Description of the Related Art

Conventionally, some optical devices, such as cameras and binoculars, are provided with camera-shake compensation functionality. In a conventional camera-shake compensation operation (or a blur compensation operation) of the camera-shake compensation device, a camera-shake (a direction and quantity of the camera-shake) of the optical apparatus, for example, is obtained by using a gyro-sensor. In the case of a digital camera, a solid-state imaging device (e.g., CCD) is moved to counteract the detected camera-shake. Further, in a sliver halide camera (or a film camera) and a binoculars, a compensation optical system (which is a part of an objective optical system) is moved to counteract the detected camera-shake. Thereby, the camera-shake that results from hand-held shake and the like is compensated, and a satisfactory image is obtained.

SUMMARY OF THE INVENTION

The color temperature of an object and the surrounding temperature vary due to the weather, a location, time, and a season, when photographing the object by a camera. Also a distance from the camera to an object differs as to which object is being selected. Further, for a high-speed object, a photographer may be required to hold the camera by hand to follow the object motion, while other objects are photographed by fixing the camera on a tripod. Accordingly, the photographing conditions are not always the same.

However, conventional camera-shake compensation does not take the above photographing conditions into consideration. Namely, in any condition, the motion of the compensation optical system and the CCD is controlled based on the output from the gyro-sensor alone. Therefore, a precision camera-shake compensation based on the photographing conditions has not been achieved.

An object of the present invention is to provide precision camera-shake compensation in accordance with the photographing conditions.

According to the present invention, a camera provided with camera-shake compensation functionality is provided that comprises a camera-shake detector, a photographing mode selector, an adjuster, and a anti-shake mechanism.

The camera-shake detector detects the quantity of shake induced in the camera. The photographing mode selector is used to select the photographing mode. The adjuster adjusts output signals from the camera-shake detector, in accordance with the photographing mode selected by the photographing mode selector. The anti-shake mechanism compensates for camera-shake that needs to be counteracted, based on the output signals adjusted by the adjuster.

The adjuster may extract predetermined frequency components from the output signals in accordance with the photographing mode.

The photographing mode may be classified by a set of information including at least one of the following: a size of an object, a distance to the object, a magnification of the image, quantity of movement in an image plane, a shutter speed, whether to pan the camera, and whether to use a tripod.

The adjuster may extract high frequency components of the output signals when the photographing mode is set as an astronomy-photographing mode. The adjuster may extract frequency components in the high frequency to about first middle frequency range of the output signals when the photographing mode is set as a bird-photographing mode. The adjuster may extract frequency components in the high frequency to about the second middle frequency range, which is lower than the first frequency, from the output signals when the photographing mode is set as a train photographing mode. The adjuster may extract frequency components of the output signals from about the middle frequency to about low frequency when the photographing mode is set as a portrait photographing mode. The adjuster may extract frequency components of the output signals about low frequency and frequency lower than the low frequency when the photographing mode is set as a night view photographing mode.

The camera-shake detector comprises a gyro sensor. Further the adjuster may comprise a plurality of band pass filters of a different frequency band and a switch that selectively connect the gyro sensor to one of the band pass filters.

The high frequency can be 30 Hz, the first middle frequency can be 20 Hz, and the low frequency can be 10 Hz.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
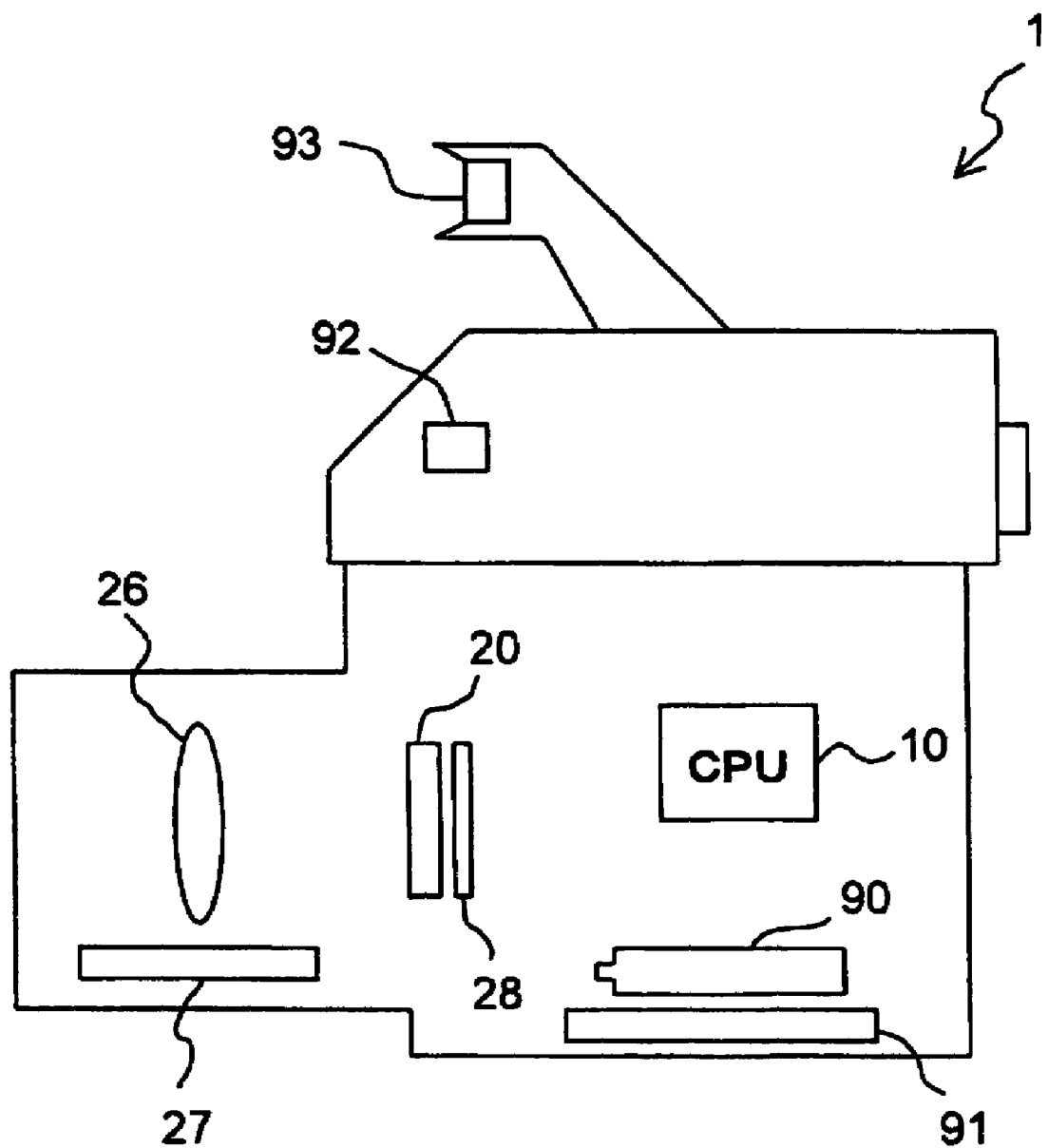
FIG. 1 schematically illustrates the inside of a digital camera to which an embodiment of the present invention is applied.

The present invention is described below with reference to the embodiments shown in the drawings.

FIG. 1 schematically illustrates the inside of a digital camera 1 to which an embodiment of the present invention is applied. A CPU 10 is a microprocessor that generally manages the digital camera 1. A battery 90 is detachably installed in the digital camera 1. Nearby the battery 90, a battery heater 91 is arranged in order to prevent the temperature fall about the battery 90. Thereby, the normal performance of the battery 90 is secured by activating the battery heater 91, even when the photographing is performed in low temperature conditions. Nearby a photographing lens 26, a lens heater 27 is arranged in order to prevent the temperature fall around the photographing lens 26. Thereby, the generation of condensation on a surface of the photographing lens 26 is prevented by activating the lens heater 27, even when the photographing is performed in the low temperature conditions. Nearby the CCD 20, a cooling device 28, such as a peltier device, is provided. A temperature sensor 92 is arranged in the upper part of the digital camera 1. The CPU 10 controls activation of the battery heater 91 and the lens heater 27 based on the temperature detected by the sensor 92. Further, on the top of the digital camera 1, a strobe 93, which can be retracted inside the casing of the digital camera 1, is provided.

Figure 2:
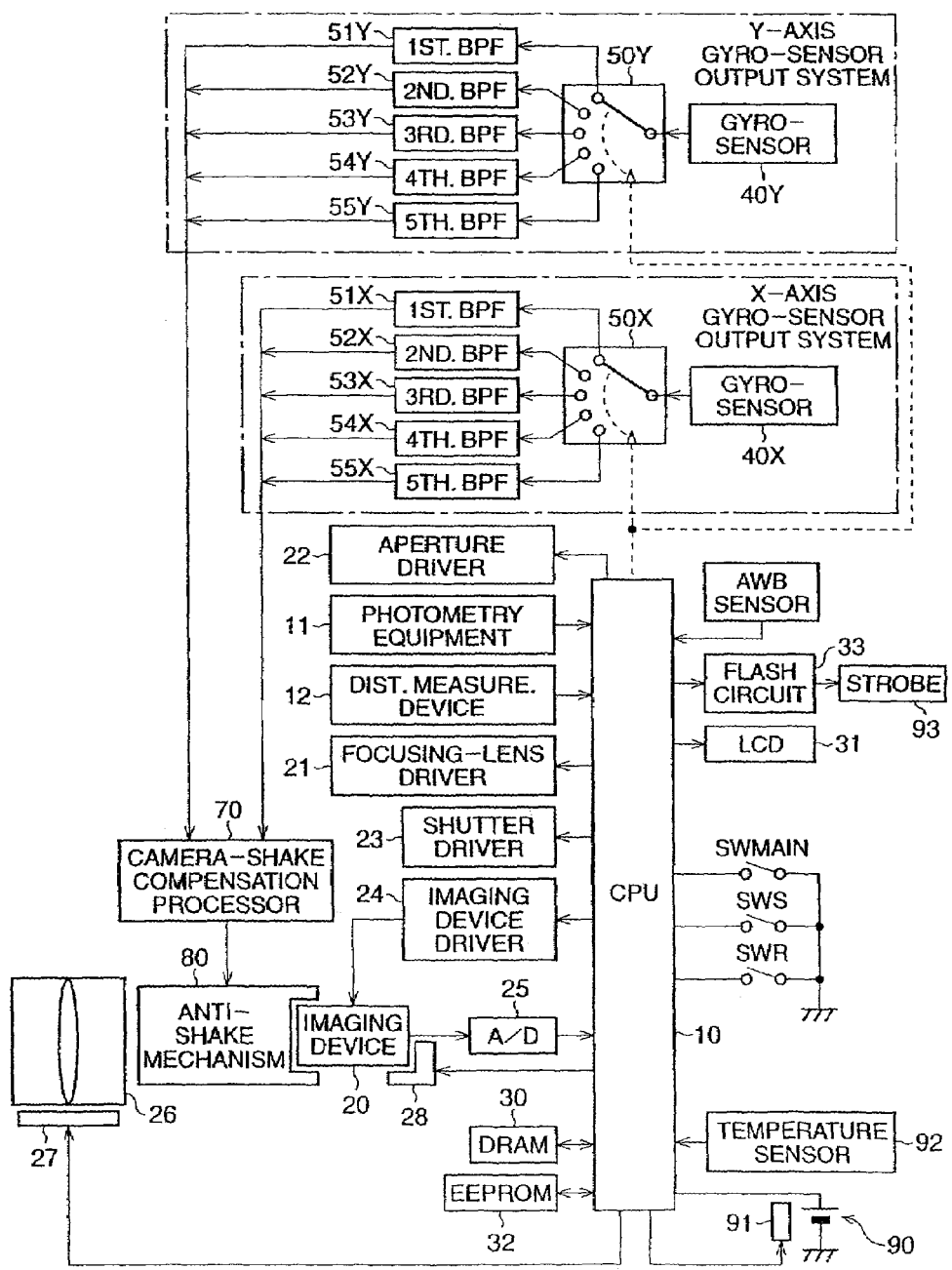
FIG. 2 is a block diagram of the digital camera.

FIG. 2 is a block diagram of the digital camera 1. The on and Off state of a power switch SWMAIN is selected by an operation of a power button (not shown) provided on the casing of the digital camera 1. As the power switch SWMAIN is turned on, the electric power is supplied from the battery 90 to the CPU 10.

A photometry switch SWS is turned on when a release button (not shown) on the casing is half depressed. When the photometry switch SWS is turned on, the CPU 10 carries out a photometry operation and a distance measurement operation. Namely, the exposure value is calculated in accordance with input from the photometry equipment 11, so that an aperture value, a shutter speed, and an electric-charge accumulating period of the imaging device 20, which are required for the photographing operation, are calculated from the above-calculated exposure value. Further, the drive quantity of a focusing lens (not shown) is calculated based on input from a distance measurement device 12 and control signals are output to a focusing-lens driver 21. Thereby, drive signals from the focusing-lens driver 21 are output to the focusing lens.

A release switch SWR is turned on when the release button is fully depressed. When the release switch SWR is turned on, the drive quantities of an aperture drive mechanism (not shown) and a shutter (not shown) are calculated by the CPU 10 from the aperture value derived in the photometry operation. Control signals are output to an aperture driver 22 and a shutter driver 23 based on a result of the calculation. Drive signals are output to the aperture drive mechanism from the aperture driver 22, so that the aperture drive mechanism is driven. When the aperture drive mechanism is driven, the power from the mechanism is transmitted to an aperture mechanism (not shown), so that the diameter of the aperture is set as a predetermined size. Further, drive signals from the shutter driver 23 are output to the shutter, so that the shutter is opened for a predetermined period of time. Due to the above-operations, light, which has passed through the photographing lens 26, is made incident on the imaging surface of the imaging device 20.

Further, control signals are fed to an imaging device driver 24 in accordance with the above-discussed electric-charge accumulating period, and drive signals from the imaging device driver 24 are then fed to the imaging device 20. In the imaging device 20, an optical image of the object, which is formed within the light receiving area, is photoelectrically converted and output from the imaging device 20 as analog image signals. The analog image signals are converted to digital image signals by an A/D converter 25, and the digital image signals are then input to the CPU 10.

The digital image signals are subjected to a predetermined image processing due to the control of the CPU 10. The image data is temporally stored in a DRAM 30 during the image processing. The image data, which has been subjected to the predetermined image processing, may be displayed on an LCD 31 which is provided on the backside of the camera body.

Programs that are used to operate the camera are installed in an EEPROM 32. Further, when quantity of light from the object is insufficient, a drive signal is output from the CPU to a flash circuit 33, so that the strobe emits illuminating light.

An X-axis gyro sensor 40X, which is connected to an X-axis gyro sensor output system, outputs voltage signals proportional to an angular velocity about an X-axis-in a plane normal to an optical axis of the camera. The X-axis gyro sensor is connectable to one of a first BPF (band pass filter) 51X, a second BPF 52X, a third BPF 53X, a fourth BPF 54X, or a fifth BPF 55X, via a switch 50X.

Figure 3:
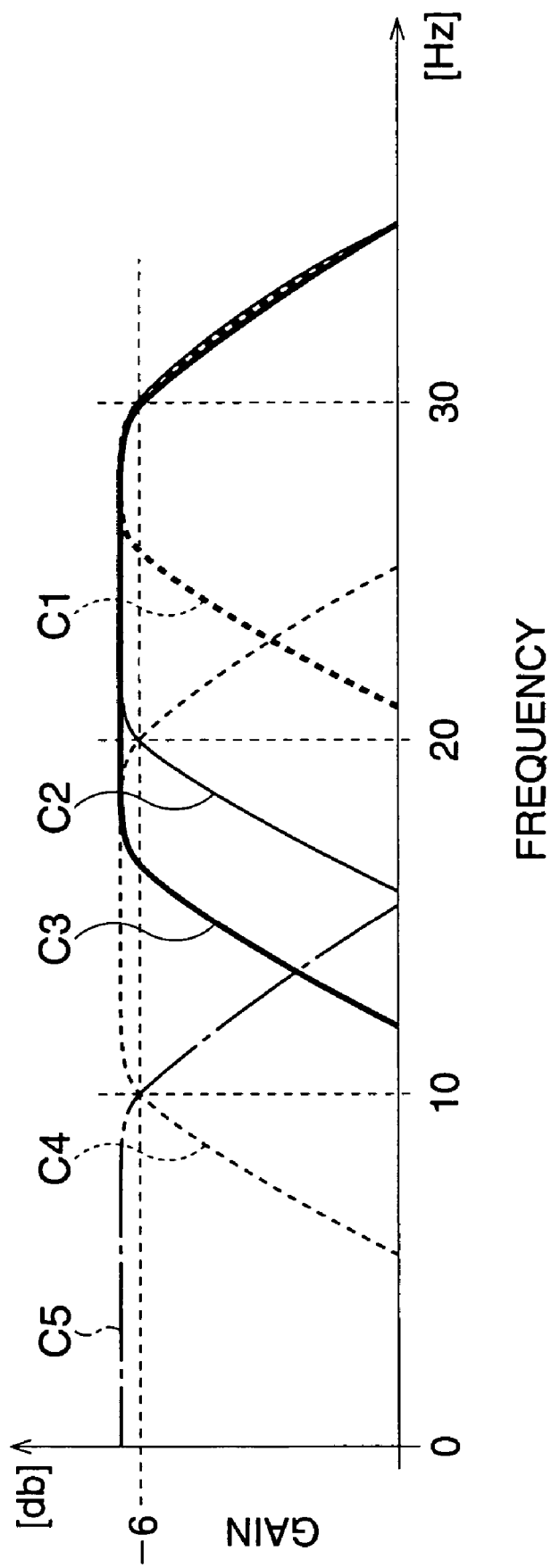
FIG. 3 is a graph that indicates frequency bands that are extracted by each of the BPFs.

FIG. 3 is a graph that indicates frequency bands that are extracted by each of the BPFs. The first BPF 51X extracts high frequency components at around 30 Hz (characterized by a curve C1). The second BPF 52X extracts frequency components in a range from a high frequency of about 30 Hz to a middle frequency of about 20 Hz (characterized by a curve C2). The third BPF 53X extracts frequency components in a range from a high-frequency of about 30 Hz to a middle frequency lower than 20 Hz (characterized by a curve C3). The fourth BPF 54X extracts frequency components in a range from a middle frequency of about 20 Hz to a low frequency of about 10 Hz (characterized by a curve C4). The fifth BPF 55X extracts frequency components in a low frequency range of about 10 Hz and below (characterized by a curve C5). Namely, a predetermined frequency band, in which frequency components of voltage signals from the X-axis gyro sensor 40X are extracted, can be selected by operating the switch 50X.

A Y-axis gyro sensor 40Y, which is connected to a Y-axis gyro sensor output system, outputs voltage signals proportional to an angular velocity about a Y-axis normal to the X-axis in a plane normal to the optical axis of the camera. The Y-axis gyro sensor is connectable to one of a first BPF (band pass filter) 51Y, a second BPF 52Y, a third BPF 53Y, a fourth BPF 54Y, or a fifth BPF 55Y, via a switch 50Y.

The first BPF 51Y extracts high-frequency components around 30 Hz, in the same way as the first BPF 51X. The second BPF 52Y extracts frequency components in a range from a high frequency of about 30 Hz to a middle frequency of about 20 Hz, in the same way as the second BPF 52X. The third BPF 53Y extracts frequency components in a range from a high frequency of about 30 Hz to a middle frequency of lower than 20 Hz, in the same way as the third BPF 53X. The fourth BPF 54Y extracts frequency components in a range from a middle frequency of about 20 Hz to a low frequency of about 10 Hz, in the same way as the fourth BPF 54X. The fifth BPF 55Y extracts frequency components in a low frequency range of about 10 Hz and below, in the same way as the fifth BPF 55X. Namely, a predetermined frequency band, in which frequency components of voltage signals from the Y-axis gyro sensor 40Y are extracted, can be selected by operating the switch 50Y.

Each of the first to fifth BPFs 51X, 52X, 53X, 54X, and 55X of the X-axis gyro sensor output system and each of the first to fifth BPFs 51Y, 52Y, 53Y, 54Y, and 55Y of the Y-axis gyro sensor output system, are connected to a camera-shake compensation processor 70. Voltage signals including only frequency components extracted from the voltage signals of the X-axis gyro sensor 40X through a BPF, which is selected from the first BPF 51X to the fifth BPF 55X by the switch 50X, are applied to a camera-shake compensation processor 70. Similarly, voltage signals including only frequency components extracted from the voltage signals of the Y-axis gyro sensor 40Y through a BPF, which is selected from the first BPF 51Y to the fifth BPF 55Y by the switch 50Y, are also applied to a camera-shake compensation processor 70. In the camera-shake compensation processor 70, integration of angular velocity about the X-axis and the Y-axis is carried out in accordance with the input voltage signals. As a result, the angular displacement about the X-axis and the Y-axis of the camera or the positional displacement information is calculated. Thereby, the quantity of shake about the X-axis and the Y-axis is calculated.

Further, in order to counteract the calculated shake, drive data of the imaging device 20 is also calculated in the camera-shake compensation processor 70. The drive data includes a direction and quantity of the drive motion in a plane normal to the optical axis of the photographing lens 26. The calculated drive data is output to an anti-shake mechanism 80. The imaging device 20 is moved in the plane normal to the optical axis of the photographing lens 26 by the anti-shake mechanism.

The CPU 10 controls the activation of the battery heater 91 and the lens heater 27 based on a temperature detected by the temperature sensor 92. If the temperature detected by the temperature sensor 92 during photographing is lower than a predetermined threshold temperature, the battery heater 21 and the lens heater 27 are activated. As a result, the temperature surrounding the battery 90 and the photographing lens 26 is maintained at a suitable temperature, so that the normal activation of the battery 90 is guaranteed and condensation on the surface of the photographing lens 26 is prevented. Further, the CPU 10 controls the operation of the cooling device 28 in accordance with the electric-charge accumulating period of the imaging device 20. When the electric-charge accumulating period of the imaging device 20 is relatively long, the temperature of the imaging device 20 is raised by the continuous supply of electricity, so that noise due to dark current may be increased. Therefore, when the electric-charge accumulating period is longer than a predetermined threshold period, the CPU 10 activates the cooling device 28 in order to suppress the rise in temperature of the imaging device 20.

Figure 4:
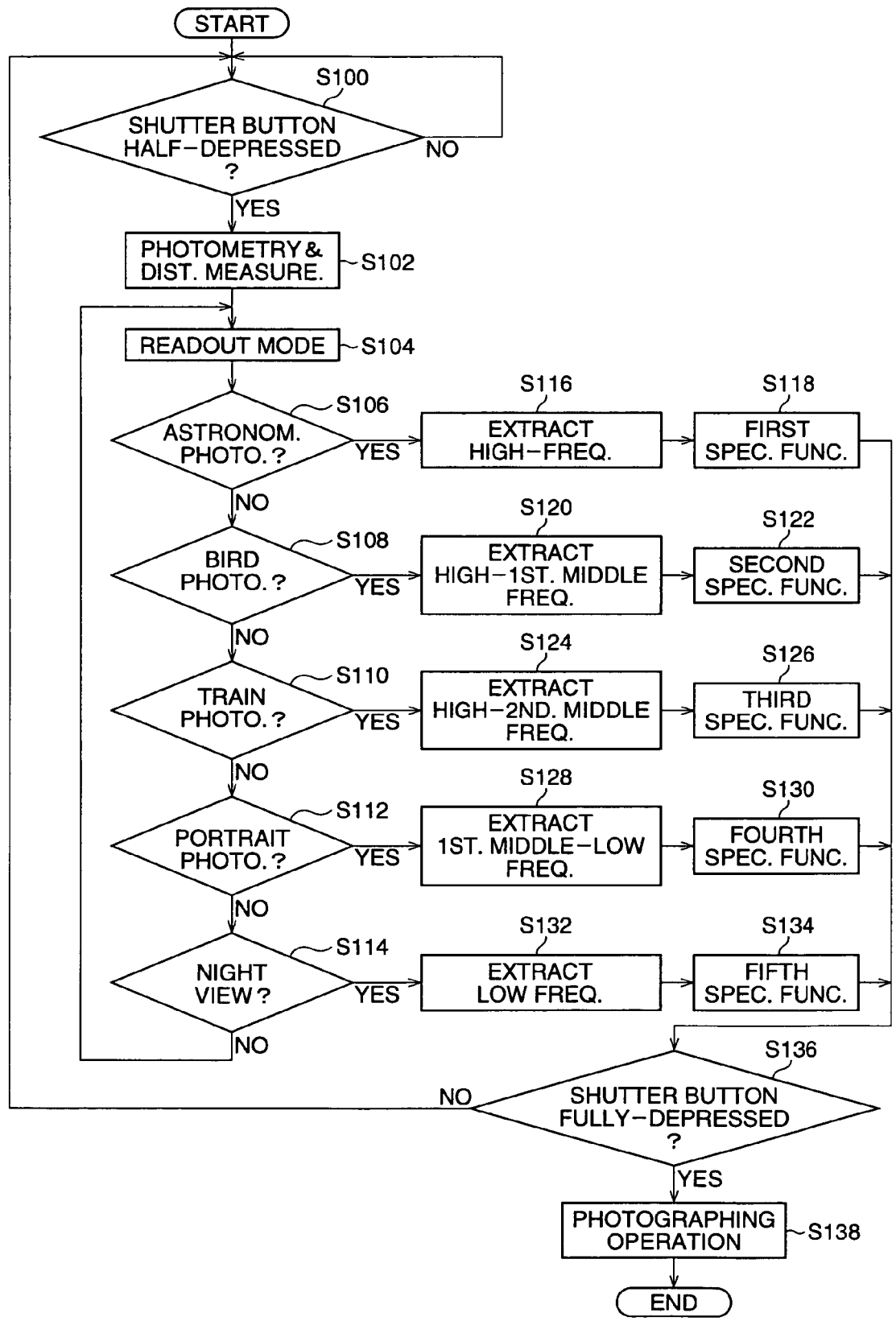
FIG. 4 is a flowchart of an image-capturing operation of the present embodiment.

FIG. 4 is a flowchart of an image-capturing operation of the present embodiment. In Step S100, the state of the switch SWS is checked in order to determine whether the shutter button provided on the casing of the digital camera is being half depressed. When it is determined that the shutter button is half depressed and the switch SWS has been turned on, the process proceeds to Step S102. In Step S102, the photometry operation and the distance measurement operation are carried out.

In Step S104, a photographing mode, which is selected by a photographer, is readout from a memory of the CPU 10. In the present embodiment, the photographing mode can be selected from five modes, including an "Astronomical photographing mode", "Bird photographing mode", "Train photographing mode", "Portrait photographing mode", and "Night view photographing mode". One of the above photographing modes is selected by an operation of a dial provided on the casing of the digital camera 1, and in turn, information relating to the selected mode is store in the memory of the CPU 10. The selected photographing mode is determined in Steps S106-S114.

When it is determined that the photographing mode is set to the "Astronomical photographing mode", the process proceeds to Step S116. In this case, an object of the photographing is an astronomical body. Therefore, the size of the object is small, the distance to an object is far, the magnification of image is low, and the blur or movement in the image plane is small. Further, in the astronomical photographing mode, an image is normally captured with the camera being fixed on a tripod, and using a long exposure time period, so that there is no drastic camera motion. Consequently, the camera-shake compensation operation should only compensate for a high-frequency camera-shake. Thereby, in Step S116, the switch 50X and the switch 50Y are controlled to connect the X-axis gyro sensor 40X to the first BPF 51X and the Y-gyro sensor 40Y to the first BPF 51Y. Consequently, only the high frequency components around 30 Hz of the voltage signals are extracted from the output signals of the X-axis gyro sensor 40X and the Y-axis gyro sensor 40Y, and fed to the camera-shake compensation processor 70.

The process then proceeds to Step S118. Generally, a suitable situation for the astronomical photographing is nighttime in the winter season. In other words, when the "Astronomical photographing model" is selected as a photographing mode, it can be presumed that the digital camera 1 is being used at nighttime in winter. Thereby, in Step S118, which is denoted as a first specific function process, the battery heater 91 and the lens heater 27 are automatically activated, despite the fact that the heaters 91 and 27 are normally activated based on the temperature detected by the temperature sensor 92. Further, the cooling device 28 is also driven. The inactivation of the battery 90 due to the low temperature is prevented by the activation of the battery heater 91, and dimness by the condensation or freezing of the photographing lens 26 is prevented by the activation of the lens heater 27. Further, the increase in noise induced by the dark current is also prevented by driving the cooling device 28 to control the rise in temperature of the imaging device 20 due to the long exposure time. Note that, heat generated during the activation of the cooling device 28 can also be used to heat the battery 90 and the photographing lens 26 in place of the battery heater 91 and the lens heater 27.

Further, in Step S118, an image adding process for improving the S/N ratio is carried out. A preset operation to counterbalance the thermal noise cannot be performed in a similar way to the fixed pattern noise, since the thermal noise of an image, randomly distributes in the image. Accordingly, the noise component of the image data can be relatively reduced by enhancing signals obtained in each of the pixels by repeatedly adding image data obtained at a certain interval under a condition where motion of the object does not show significance in the image.

When it is determined in Step S108 that the photographing mode is set as the "Bird photographing mode", the process proceeds to Step S120. Since the object is a bird, in general, the size of an object is small, the distance to the object is far, the magnification of the image is high, and blur or movement in the image plane is large. Further, when photographing a bird, a tripod is generally not used and a shutter speed is preset to a high speed. Sometimes, the camera is moved quickly or panned to track the flying target. Therefore, the camera-shake compensation operation should only compensate for a camera-shake within the range from the high frequency to the middle frequency. Thereby, in Step S120, the switch 50X and the switch 50Y are controlled to connect the X-axis gyro sensor 40X to the second BPF 52X and the Y-gyro sensor 40Y to the second BPF 52Y. Consequently, only the voltage signal components from about 30 Hz of the high frequency to about 20 Hz of the middle frequency are extracted from the output signals of the X-axis gyro sensor 40X and the Y-axis gyro sensor 40Y, and fed to the camera-shake compensation processor 70.

The process then proceeds to Step S122. The bird is basically photographed outside. Therefore, in a second specific function process of Step S122, the battery heater 91 is activated. Thereby, even in winter, the inactivation of the battery 90 due to the low temperature is prevented by the activation of the battery heater 91. Further, the focusing is carried out within a distance range where the magnification of image is high. Namely, the range of the photographing lens' 26 is restricted and a zone focus is carried out, thereby the focusing operation is accelerated by reducing a focusing range of an AF operation. Specifically, the AF operation is restricted so that the magnification is set to an amount where by the imaging area to be photographed is a bird-sized area (e.g. 50 cm by 75 cm).

When it is determined in Step S110 that the photographing mode is set as the "Train photographing mode", the process proceeds to Step S124. Since the object is a train, in general, the size of an object is large, the distance to the object is far, the magnification of image is low, and blur or movement in the image plane is small. Further, a train is often photographed while the train is stopped. Therefore, a tripod is generally used and a shutter speed is preset to a middle speed. Further, the camera is rarely moved. Therefore, the camera-shake compensation operation should only compensate for a camera-shake within the range from the high frequency to the middle frequency or slightly lower than the middle frequency. Thereby, in Step S124, the switch 50X and the switch 50Y are controlled to connect the X-axis gyro sensor 40X to the third BPF 53X and the Y-gyro sensor 40Y to the third BPF 53Y. Consequently, only the voltage signal components from the high frequency (about 30 Hz) to the middle frequency (lower than 20 Hz) range are extracted from the output signals of the X-axis gyro sensor 40X and the Y-axis gyro sensor 40Y, and fed to the camera-shake compensation processor 70.

The process then proceeds to Step S126. The train is basically photographed outside. Therefore, in a third specific function process of Step S126, the battery heater 91 is activated. Thereby, even in winter, the inactivation of the battery 90 due to the low temperature is prevented by the activation of the battery heater 91. Further, the focusing is carried out within a distance range where the magnification of image is low. Specifically, since the object is a train, the AF operation is restricted to a range in which the magnification is the correct size for capturing a train (e.g. 5 m by 7.5 m), which is larger than the size for photographing the bird.

When it is determined in Step S112 that the photographing mode is set as the "Portrait photographing mode", the process proceeds to Step S128. Since the object is a person, in general, the size of the object is large, the distance to the object is near, the magnification of the image is low, and blur or movement in the image plane is small. Further, a portrait is usually photographed without using a tripod and a shutter speed is preset to a middle speed. Further, the camera is moved quickly in some situations. Therefore, the camera-shake compensation operation should only compensate for a camera-shake with in the range from the middle frequency to the low frequency. Thereby, in Step S128, the switch 50X and the switch 50Y are controlled to connect the X-axis gyro sensor 40X to the fourth BPF 54X and the Y-gyro sensor 40Y to the fourth BPF 54Y. Consequently, only the voltage signal components from the middle frequency of about 20 Hz to the low frequency of about 10 Hz are extracted from the output signals of the X-axis gyro sensor 40X and the Y-axis gyro sensor 40Y, and fed to the camera-shake compensation processor 70.

The process then proceeds to Step S130. In a fourth specific function process of Step S130, the daylight synchro mode is set. Namely, the shutter speed and the aperture value are preset to values which are appropriate for the daylight synchro operation and the strobe 93 is activated so as to flash in the photographing operation.

When it is determined in Step S114 that the photographing mode is set as the "Night view photographing mode", the process proceeds to Step S132. Since the object is a night view, in general, the size of an object is large, the distance to the object is near, the magnification of image is low, and blur or movement in the image plane is small. Further, a view is usually photographed with a tripod and a shutter speed is preset to a low speed. Further, the camera is not moved. Therefore, the camera-shake compensation operation should only compensate for a camera-shake of low frequency. Thereby, in Step S132, the switch 50X and the switch 50Y are controlled to connect the X-axis gyro sensor 40X to the fifth BPF 55X and the Y-gyro sensor 40Y to the fifth BPF 55Y. Consequently, only the voltage signal components having a frequency lower than the frequency of about 10 Hz are extracted from the output signals of the X-axis gyro sensor 40X and the Y-axis gyro sensor 40Y, and fed to the camera-shake compensation processor 70.

The process then proceeds to Step S134. In the fifth specific function process of Step S134, the shutter speed and the aperture value are preset to values which are appropriate for the night view photographing and the strobe 93 is activated so as to flash in the photographing operation. Further, in this step, the above described image adding process is carried out in order to improve the S/N ratio.

As described above, the specific function processes (activation of the battery heater and the lens heater, synchro photographing operation, and so on) are carried out in Steps S118, S122, S126, S130, and S134. Note that, these functions can be altered by a user in accordance with the preference of the user and the photographing situation. For example, the activation of the battery heater 91 in the astronomical photographing mode can be suspended when the photographing is carried out in summer.

When a specific function, which corresponds to one of the photographing modes, has been set in Step S118, S122, S126, S130, or S134, the process proceeds to Step S136. In Step S136, the state of the release switch SWR is checked, so that whether the shutter button on the casing of the digital camera 1 is fully depressed is determined. When it is determined that the shutter button is fully depressed and the release switch SWR has been turned on, the process proceeds to Step S138. In Step S138, a control signal is output from the CPU 10 to the imaging device driver 24, and in turn, drive signals are fed from the imaging device driver 24 to the imaging device 20. As a result, the photographing operation is carried out in the imaging device 20. When it is determined in Step S136 that the shutter button has not been fully depressed, the process returns to Step S100 and the above-described processes are repeated.

In the camera-shake compensation operation, the output from the X-axis gyro sensor 40X and the Y-axis gyro sensor 40Y is adjusted (or filtered) in Step S116, S120, S124, S128, or S132, and the specific function is set in Step S118, S122, S126, S130, or S134. Further, these processes are repeated.

Note that, in the present embodiment, the camera-shake is counteracted by the motion of the imaging device 20, however, the mechanism of the camera-shake compensation is not restricted to this type. The method of extracting the frequency components from the voltage signals of the gyro sensors 40X and 40Y based on the photographing mode, can also be applied to the camera-shake compensation mechanism that drives the compensation optical system (which composes a part of the photographing lens 26) to counteract the camera-shake.

As described above, according to the present embodiment, frequency of the camera-shake, which is subjected to the camera-shake compensation, is determined by a photographing mode that is selected by the user. Therefore, a camera-shake compensation that is suitable for each of the photographing modes is carried out.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-203173 (filed on Jul. 9, 2004) which is expressly incorporated herein, by reference, in its entirety.

The invention claimed is:

1. A camera provided with camera-shake compensation functionality, comprising:
   a camera-shake detector that detects quantity of shake of said camera;
   a photographing mode selector that is used to select a photographing mode;
   an adjuster that adjusts output signals from said camera-shake detector, in accordance with said photographing mode selected by said photographing mode selector; and
   an anti-shake mechanism that compensates for a camera-shake to be counteracted, based on the output signals adjusted by said adjuster,
   wherein said adjuster extracts predetermined frequency components from the output signals in accordance with said photographing mode, and
   wherein said photographing mode is classified by a set of information including at least one of a size of an object, a distance to said object, a magnification, a quantity of movement in an image plane, a panning operation, and use of a tripod.

2. A camera according to claim 1,
   wherein said adjuster extracts frequency components of the output signals in a high frequency range when said photographing mode is set as an astronomical photographing mode;
   said adjuster extracts frequency components of the output signals from about the high frequency to about first middle frequency ranges when said photographing mode is set as a bird photographing mode;
   said adjuster extracts frequency components of the output signals from about the high frequency to about second middle frequency ranges, the second middle frequency range being lower than the first middle frequency range, when said photographing mode is set as a train photographing mode;
   said adjuster extracts frequency components of the output signals from about the first middle frequency to about low frequency when said photographing mode is set as a portrait photographing mode; and
   said adjuster extracts frequency components of the output signals in the low frequency range when said photographing mode is set as a night view photographing mode.

3. A camera according to claim 2,
   wherein said camera-shake detector comprises a gyro sensor, and said adjuster comprises a plurality of band pass filters, each having a different frequency band, and a switch that selectively connects said gyro sensor to one of said band pass filters.

4. A camera according to claim 2,
   wherein said high frequency range is around 30 Hz, said first middle frequency range is around 20 Hz, and said low frequency range is around 10 Hz.

* * * * *